United States Patent

[11] 3,630,229

| [72] | Inventors | Wayn A. Nagel<br>Alexandria, Va.;<br>William H. Stoddard, North Stonington, Conn. |
|---|---|---|
| [21] | Appl. No. | 27,013 |
| [22] | Filed | Apr. 9, 1970 |
| [45] | Patented | Dec. 28, 1971 |
| [73] | Assignee | The United States of America as represented by the Secretary of the Navy |

[54] QUIET FLUID FLOW REGULATOR
12 Claims, 4 Drawing Figs.

[52] U.S. Cl. .................................. 137/625.3, 251/118
[51] Int. Cl. .................................. F16k 47/02
[50] Field of Search.......................... 251/118, 209, 210; 137/625.3, 625.32, 375

[56] References Cited
UNITED STATES PATENTS

| 3,023,783 | 3/1962 | Vickery | 137/625.32 X |
| 3,170,483 | 2/1965 | Milroy | 251/118 X |
| 3,183,926 | 5/1965 | Boudot | 251/118 X |
| 3,042,078 | 7/1962 | Rosell | 137/625.3 |
| 1,205,394 | 11/1916 | Roberts | 251/209 X |
| 2,775,486 | 12/1956 | King | 251/118 X |
| 3,463,691 | 8/1969 | Martin | 137/375 X |
| 3,139,106 | 6/1964 | Wallin | 137/375 |

*Primary Examiner*—Arnold Rosenthal
*Attorneys*—Richard S. Sciascia, Louis B. Applebaum and Philip Schneider ABSTRACT: A device for quietly throttling the flow of a fluid stream comprising a plurality of paralleled frictionally resistant tubes inserted into the fluid flow path and ball valve means at one end of the tubes. A pressure equalized, biased seal maintains constant pressure against the ball of the valve means to prevent leakage around the ball. Vibration-absorbing packing surrounds the space between and around the tubes. Each tube is internally rounded at its entry end and flared at its exit end.

INVENTORS.
WAYN A. NAGEL
WILLIAM H. STODDARD
BY Philip Schneider
Don B. Appleton
ATTORNEYS

QUIET FLUID FLOW REGULATOR

The invention described herein may be manufactured and used by or for the Government of the United States of America for governmental purposes without the payment of any royalties thereon or therefor.

The invention relates to fluid flow regulation and especially to improved, quiet throttling devices for regulating the flow of fluid in a pipe or the like.

Old methods for controlling the flow of fluid through a pipe utilized valves or orifices, including nozzles, globe valves, gate valves and ball valves. These devices provide flow control at the expense of increased noise generation caused principally by cavitation and turbulence when throttling the flow.

An object of the invention is to provide an improved throttling means for controlling the flow of fluid through a pipe and for reducing the noise resulting from such flow regulation.

This and other objects of the invention are accomplished by a throttling device which breaks a fluid stream into a plurality of parallel flow paths which are provided with frictional resistance. Smooth regulation of the amount of fluid flow is provided by ball valve means and a pressure-equalized, biased seal, which provides constant pressure between the ball valve and the ends of the flow tubes. Further reduction of flow noise is accomplished by providing acoustic packing between the flow tubes which convey the fluid, rounding off the entry ends of the tubes and flaring the exit ends.

Other objects, advantages and novel features of the invention will become apparent from the following detailed description of the invention when considered in conjunction with the accompanying drawings wherein.

Figure 1:
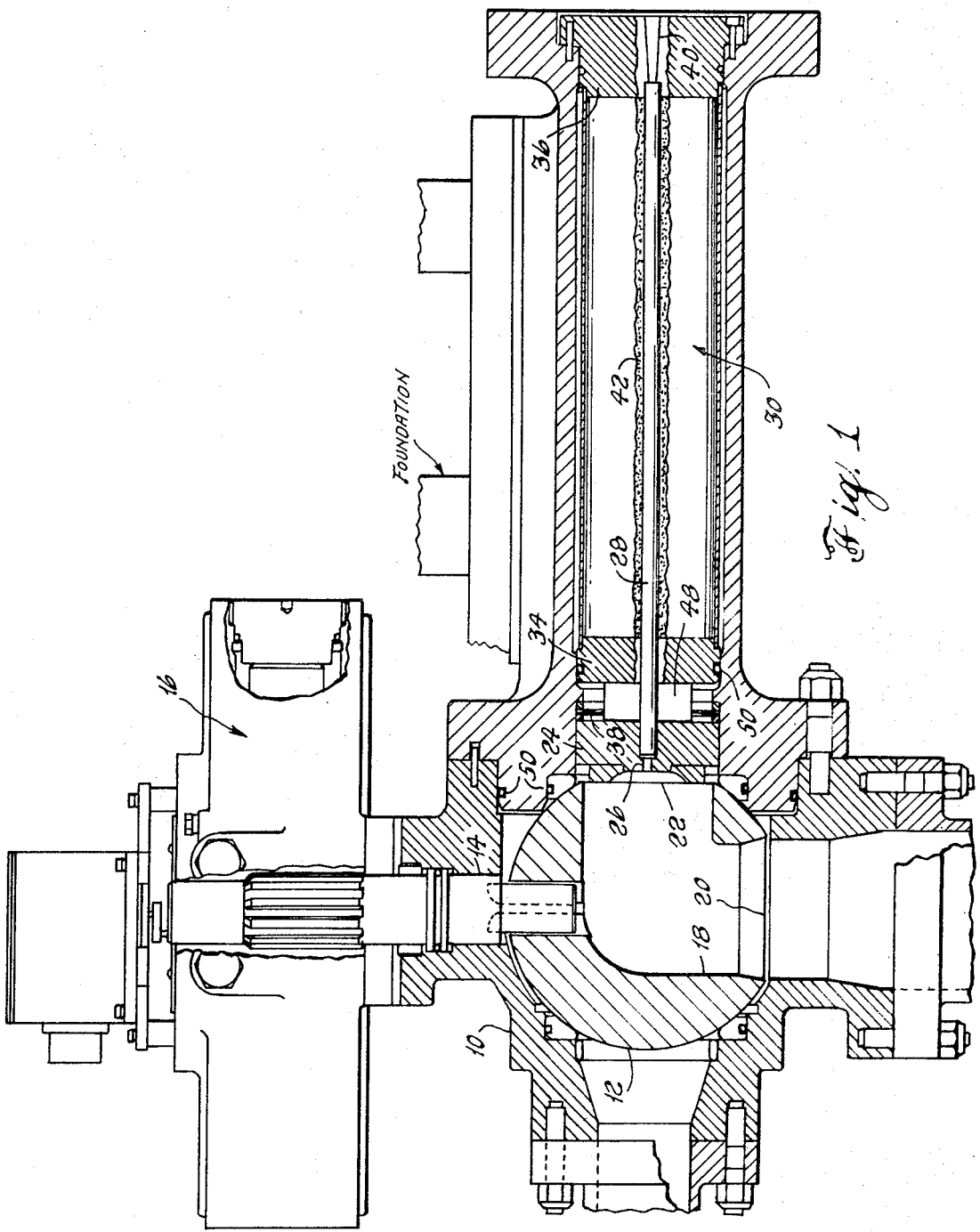
FIG. 1 is an illustration, partially in cross section, of an embodiment of the invention.

A schematic view of the regulator device, partially in cross section, is shown in FIG. 1. The ball 12 of the ball valve body 10 can be rotated by a shaft 14 from a hydraulic or pneumatic actuator 16, or by hand or other means suitable for valve size and application.

A fluid channel 18 inside the ball 12 has two ports, a lower port 20 and a right-hand port 22, which constitute an entry and an exit port, respectively, for the fluid. The exit port 22 connects with one end of a sealing block or sealing face insert 24 which has longitudinal bores 26 drilled therethrough. The sealing face insert 24 is pressed firmly against the ball 12 by a biasing means 38 such as a wave washer or the spring which is shown.

The ball 12 is conventional and can be rotated in a continuous manner, or be moved in steps to desired positions, to shut off fluid flow very gradually as the exit port area is rotated across the contact area of the sealing face insert, while maintaining a sealing contact with the insert. The rotation of the ball can be stopped or started by any intermediate position of the ball exit port with respect of tube bore area, from fully closed to fully open.

A plurality of paralleled flow tubes 28 extend into the bores 26 in the sealing face insert 24 (for the sake of simplicity, only one tube 28 and bore 26 are shown in FIG. 1). The paralleled tubes 28 comprise a frictional pressure-drop means 30 which may consist of other orificed means for dividing a single flow into a plurality of narrower flows which encounter frictional resistance. For example, the frictional pressure-drop means 30 may have tubes of other shapes, such as the tube shown in FIG. 2, which has internal indentations 32, as illustrated, which provide frictional resistance for the flow. The use of tubes as flow silencing means is taught in U.S. Pat. No. 3,170,438. Unfortunately, the reduction in noise by the use of these tubes alone is not sufficient for all applications; for example, submarines require more noise reduction for the quiet-running condition.

The tubes 28 are retained at one end by a retaining insert 34 and at the other end by a diffuser block or insert 36. The diffuser block 36 has a flared longitudinal bore 40 for each tube 28, the narrower end of the bore 40 connecting with the end of the tube 28.

Vibration absorbing material 42 is packed around the flow tubes 28 to absorb vibrational, or acoustic, energy. This material may, for example, constitute an epoxy mixture comprising 40 parts of epoxy resin (such as the Union Carbide Company's ERL 2795, or equivalent) with 60 parts of curing agent (such as General Mills' Versamid 140, or equivalent), either by weight or by volume. The mixing continues until all air is removed.

Figures 2, 3, 4:
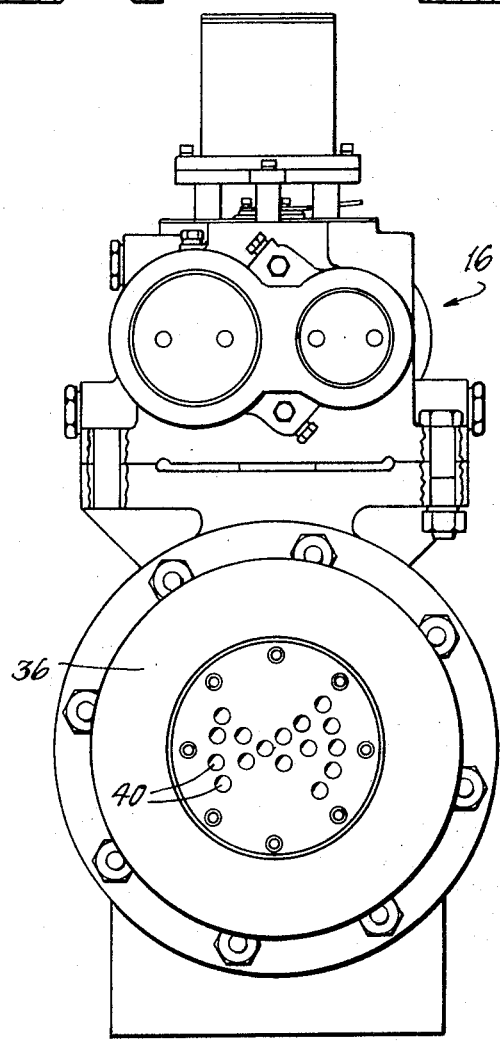
FIG. 2 is a sectional view of a type of tube which has internal indentations to provide frictional resistance.
FIG. 3 is a sectional view showing the internal rounding off of the entry end of a tube.
FIG. 4 is an end view of the exit end of the diffuser section.

The entry ends of the tubes 28 preferably are rounded off internally, or smoothly bevelled, as seen in FIG. 3 at 44, to reduce the inlet pressure drop and thereby decrease noise. The flared bores in the diffuser insert 36 decrease the exit velocity of the flow also decreasing exit noise and exit pressure drop.

The tubes 28 may be fabricated from any rigid material such as metal, fiberglass, thermoplastics, glass, ceramics, etc. The retainer insert 34 should be fabricated from a nonmetallic material such as plexiglass, thermoplastics, nylon, Teflon, etc. The sealing insert 24 may be made from a nonmetallic material with a low-friction characteristic such as Teflon, nylon, high-density polyethylene or other thermoplastics, glass or rubber of 60–80 durimeter hardness. The diffuser insert 36 may be made of the materials that are used for the retainer insert 34.

The sealing means is employed because it has been found that, without it, the fluid leaks past the part of the ball 12 which is supposed to shut off the tubes 28 and this leakage produces undesired noise. This must be prevented if complete control of the flow is desired.

In the tubes that are not closed by the ball 12, fluid is permitted to leak around the outer circumference of each tube (along the part of the bore designated by numeral 46, for example) into the pressure-equalization space 48. The fluid fills this space and then provides back pressure to equalize the forward pressure exerted by the fluid. If this were not done, the biasing means 38 would have to be made much stronger and would cause too much friction between ball 12 and the sealing insert 24 when the former is rotated. The leakage of the fluid may be accomplished by any convenient means, such as cutting a narrow groove along the bore 26, or making the bore diameter sufficiently larger than the tube's outside diameter so that the proper amount of leakage occurs. A separate pressure-equalization path may also be provided. The leakage means and the pressure-equalization cavity 48 for retaining the fluid comprise what is termed "pressure-equalization means."

The fluid is kept from leaking out of the ball valve housing and the housing for the frictional pressure-drop means by several strategically placed O-rings 50.

The distribution of the tubes 28 is shown in FIG. 4 in an end view of the diffuser insert 36. What is actually seen in this view is the exit ends of the flared bores 40. Other geometrical arrangements may also be employed.

Obviously many modifications and variations of the present invention are possible in the light of the above teachings. It is therefore to be understood that within the scope of the appended claims the invention may be practiced otherwise than as specifically described.

We claim:

1. A regulator for controlling the flow of a stream of fluid comprising, in combination:
   ball valve means admitting said stream of fluid and including a rotatable ball having an excised portion therein:
   frictional pressure-drop means for breaking a fluid stream into a plurality of narrower streams and for interposing frictional resistance into the paths of said smaller streams whereby the pressure drop of said streams is increased;

said ball valve means feeding said stream of fluid to said pressure-drop means and being operable to close off the flow of one or more of said smaller streams in a continuous manner; and sealing means, lying between said ball valve means and said pressure-drop means, for sealing said ball valve means against fluid leakage around said ball said sealing means comprising a sealing insert having a front surface which is adjacent to said ball valve means and a rear surface which couples with said pressure-drop means;

biasing means for pressing said sealing insert against said ball; and pressure-equalizing means for exerting fluid pressure on the rear surface of said sealing insert in opposition to the fluid pressure exerted on the front surface of the insert which presses against said ball.

2. A regulator for controlling the flow of a stream of fluid comprising, in combination:

ball valve means admitting said stream of fluid and including a rotatable ball having an excised portion therein:

frictional pressure-drop means for breaking a fluid stream into a plurality of narrower streams and for interposing frictional resistance into the paths of said smaller streams whereby the pressure drop of said steams is increased said frictional pressure-drop means comprising a plurality of tubes, said ball valve means feeding said steam of fluid to said pressure-drop means and being operable to close off the flow of one or more of said smaller streams in a continuous manner; and sealing means, lying between said ball valve means and said pressure-drop means, for sealing said ball valve means against fluid leakage around said ball, said sealing means including a plurality of longitudinal bores extending through said sealing means, each said tube being fitted into one of said bores at one end and extending out of said sealing means at the other end.

3. A regulator for controlling the flow of a stream of fluid comprising, in combination:

ball valve means admitting said steam of fluid and including a rotatable ball having an excised portion therein:

frictional pressure-drop means for breaking a fluid stream into a plurality of narrower streams and for interposing frictional resistance into the paths of said smaller streams whereby the pressure drop of said streams is increased;

said ball valve means feeding said stream of fluid to said pressure-drop means and being operable to close off the flow of one or more of said smaller streams in a continuous manner; and sealing means, lying between said ball valve means and said pressure-drop means, for sealing said ball valve means against fluid leakage around said ball, said sealing means including pressure equalizing means for allowing the stream to exert fluid pressure on said sealing means in opposition to the fluid pressure exerted on it by the fluid stream coming through said ball valve means, and vibration-absorbing means surrounding said frictional pressure-drop means.

4. A regulator as in claim 3, further including diffusing means comprising means for gradually increasing the diameter of the flow stream exiting from each said frictional pressure-drop means.

5. A regulator as in claim 3, further including diffusing means comprising a plurality of flared tubes, the narrower end of each being coupled to the exit end of a different one of said frictional pressure-drop means.

6. A regulator as in claim 3, each said frictional pressure-drop means being smoothly beveled internally at its entry end.

7. A regulator for controlling the flow of a stream of fluid comprising, in combination:

throttling means having entry and exit ports for admitting and closing off the flow of said stream in a continuous manner;

noise-reducing means for reducing the noise generated by said fluid stream comprising frictional pressure-drop means for breaking the fluid stream into a plurality of narrower streams and for interposing frictional resistance into the paths of said smaller streams whereby the pressure drop of said streams is increased; and sealing means located between said throttling means and said noise-reducing means for sealing off said throttling means against leakage of fluid while permitting the fluid to flow through said sealing means to said pressure-drop means, noise-reducing means for reducing the noise generated by said fluid stream comprising frictional pressure-drop means for breaking the fluid stream into a plurality of narrower streams and for interposing frictional resistance into the paths of said smaller streams whereby the pressure drop of said streams is increased; and sealing means located between said throttling means and said noise-reducing means for sealing off said throttling means against leakage of fluid while permitting the fluid to flow through said sealing means to said pressure-drop means, said frictional pressure-drop means comprising a plurality of tubes, and said sealing means comprising a sealing block having a plurality of longitudinal bores extending through said sealing means, each bore having an entry and an exit end, the entry end of each said tube being fitted into the exit end of a different one of said bores.

8. A regulator for controlling the flow of a stream of fluid comprising, in combination:

throttling means having entry and exit ports for admitting and closing off the flow of said stream in a continuous manner, said throttling means comprising ball valve means having an excised ball, the excisions comprising the entry and exit ports, and rotator means for rotating said ball, noise-reducing means for reducing the noise generated by said fluid stream comprising frictional pressure-drop means for breaking the fluid stream into a plurality of narrower streams and for interposing frictional resistance into the paths of said smaller streams whereby the pressure drop of said streams is increased; and sealing means located between said throttling means and said noise-reducing means for sealing off said throttling means against leakage of fluid while permitting the fluid to flow through said sealing means to said pressure-drop means, said frictional pressure-drop means comprising a plurality of tubes, and said sealing means comprising a sealing block having a plurality of longitudinal bores extending through said sealing means, each bore having an entry and an exit end, the entry end of each said tube fitted into the exit end of a different one of said bores.

9. A regulator as in claim 8, said sealing means further including:

biasing means for pressing said sealing means against said ball; and pressure-equalizing means for allowing the fluid to exert pressure on said sealing means in opposition to the fluid pressure exerted on it by the fluid stream coming through said ball.

10. A regulator as in claim 9, said noise-reducing means further including:

vibration-absorbing means surrounding said pressure-drop tubes.

11. A regulator as in claim 9, said noise-reducing means further including:
a plurality of flared tubes, the narrower end of each flared tube being coupled to the exit end of a different one of said pressure-drop tubes.

12. A regulator as in claim 9, wherein the entry end of each pressure-drop tube is smoothly beveled internally.

* * * * *